United States Patent
Rousseau et al.

(10) Patent No.: US 10,652,480 B2
(45) Date of Patent: May 12, 2020

(54) DISPLAY EXPOSURE MONITORING MODULE

(71) Applicant: Essilor International, Charenton-le-Pont (FR)

(72) Inventors: Denis Rousseau, Charenton-le-Pont (FR); Guillaume Broutin, Charenton-le-Pont (FR); Jean Sahler, Charenton-le-Pont (FR); Marie Lore, Charenton-le-Pont (FR); Paul Gil, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/076,945

(22) PCT Filed: Feb. 22, 2017

(86) PCT No.: PCT/EP2017/053977
§ 371 (c)(1),
(2) Date: Aug. 9, 2018

(87) PCT Pub. No.: WO2017/144489
PCT Pub. Date: Aug. 31, 2017

(65) Prior Publication Data
US 2019/0052817 A1    Feb. 14, 2019

(30) Foreign Application Priority Data
Feb. 23, 2016  (EP) .................................. 16305210

(51) Int. Cl.
*H04N 21/422* (2011.01)
*G06F 3/14* (2006.01)
(Continued)

(52) U.S. Cl.
CPC ............... *H04N 5/247* (2013.01); *G06F 3/14* (2013.01); *H04N 5/225* (2013.01);
(Continued)

(58) Field of Classification Search
CPC ...... H04N 5/247; H04N 5/225; H04N 5/2353; H04N 21/42201; H04N 21/42218;
(Continued)

(56) References Cited

U.S. PATENT DOCUMENTS

2012/0050500 A1* 3/2012 Yamaguchi ...... H04N 21/44204
                                                      348/51
2012/0092172 A1* 4/2012 Wong ..................... G06F 3/011
                                                      340/575
(Continued)

FOREIGN PATENT DOCUMENTS

WO    WO 2015/075035 A1    5/2015
WO    WO 2015/173388 A2    11/2015

OTHER PUBLICATIONS

International Search Report dated Apr. 24, 2017 in PCT/EP2017/053977 filed Feb. 22, 2017.

*Primary Examiner* — Thomas D Alunkal
(74) *Attorney, Agent, or Firm* — Oblon, McClelland, Maier & Neustadt, L.L.P.

(57) ABSTRACT

A display exposure monitoring module configured to monitor the exposure of a person to at least a display, the module including a communication component configured to receive display exposure data indicative of the exposure of the person to a display, a memory storing computer executable instructions and configured to store the received display exposure data; and a processor for executing the computer executable instructions, wherein the computer executable instructions includes instructions for processing the display exposure data to generate display exposure information (Continued)

indicative of an alert information and/or a visual behavior recommendation and/or an activation parameter.

14 Claims, 2 Drawing Sheets

(51) Int. Cl.
  *H04N 5/247* (2006.01)
  *H04N 21/442* (2011.01)
  *H04N 5/225* (2006.01)
  *H04N 5/235* (2006.01)
  *G02B 27/01* (2006.01)

(52) U.S. Cl.
  CPC ..... *H04N 5/2353* (2013.01); *H04N 21/42201* (2013.01); *H04N 21/44218* (2013.01); *G02B 2027/0178* (2013.01)

(58) Field of Classification Search
  CPC ...... G06F 3/14; G09G 5/003; G06K 9/00604; G06K 9/0061
  See application file for complete search history.

(56) References Cited

U.S. PATENT DOCUMENTS

| | | |
|---|---|---|
| 2012/0182206 A1 | 7/2012 | Cok et al. |
| 2013/0342309 A1 | 12/2013 | Jiang |
| 2014/0152444 A1* | 6/2014 | Lee ................. G08B 21/06 340/575 |
| 2016/0131908 A1* | 5/2016 | Fateh ................ G06F 3/147 345/633 |
| 2016/0180801 A1* | 6/2016 | Lee ................. H04M 1/72569 345/156 |
| 2016/0300102 A1 | 10/2016 | Hajiyev et al. |
| 2017/0127055 A1* | 5/2017 | Khabiri ............... G02B 27/017 |

* cited by examiner

DISPLAY EXPOSURE MONITORING MODULE

FIELD OF THE INVENTION

The invention relates to a display exposure monitoring module configured to monitor the exposure of a person to at least a display, a display exposure determining device comprising at least one display exposure sensor, a display exposure monitoring system and a method for determining display exposure information related to the exposure of a person to at least a display.

BACKGROUND OF THE INVENTION

It has been demonstrated that the time spend by individuals watching a screen increases with the use of smartphones and tablets. Because the electronic displays, such as computer screens, TV, smartphones and tablets, do not have the same effect on visual fatigue and health of individuals than natural view, it is important to monitor when an individual is spending time facing an electronic display.

Therefore, there is a need for a method and device for determining when an individual is watching an electronic display and eventually how long has he been watching such electronic display.

One object of the present invention is to provide such a method and device.

SUMMARY OF THE INVENTION

To this end, the invention proposes a display exposure monitoring module configured to monitor the exposure of a person to at least a display, the module comprising:
a communication component configured to receive display exposure data indicative of the exposure of the person to a display,
a memory storing computer executable instructions and configured to store the received display exposure data; and
a processor for executing the computer executable instructions, wherein the computer executable instructions comprises instructions for processing the display exposure data to generate display exposure information indicative of an alert information and/or a visual behavior recommendation and/or an activation parameter.

Advantageously, the display exposure monitoring module can be mounted on an existing equipment such as a head mounted device or communicate with a sensing device to monitor the display exposure of a user.

According to further embodiments which can be considered alone or in combination:
the display exposure data comprise time exposure data indicative of the time of exposure of the person to at least one display; and/or
the display exposure data comprise electromagnetic wave data indicative of a feature of the electromagnetic waves received by the person, in particular by the eyes of the person, when using the at least one display; and/or
the electromagnetic wave data comprise electromagnetic wave display data indicative of the frequency and/or intensity of the electromagnetic wave emitted by the display used by the person; and/or
the communication component is further configured to receive visual fatigue data indicative of the visual fatigue of the person and the instructions for processing the display exposure are arranged to generate display exposure information considering the received visual fatigue data; and/or
the communication component is further configured to communicate at least part of the display exposure information to the at least one display device.

The invention further relates to a display exposure determining device comprising at least one display exposure sensor configured to sense at least one display exposure parameter indicative of the exposure of a person to at least a display when using the display exposure determining device and a communication unit configured to communicate display exposure data indicative of the exposure of the person to a display exposure monitoring module according to the invention.

According to further embodiments which can be considered alone or in combination:
the display exposure sensor comprises a scene image acquisition sensor, for example a camera, configured to acquire a scene image of the environment facing the person and an image processing module configured to process the acquired images to identify an active display in the environment facing the person; and/or
the display exposure monitoring module is embedded in the device; and/or
the display exposure determining device is one of the devices comprised in the list consisting of a head mounted device, a smartphone and a tablet.

The invention also relates to a display exposure monitoring system comprising a display exposure monitoring module according to the invention and a display exposure determining device according to invention, wherein the display exposure determining device is configured to send display exposure data to the display exposure monitoring module.

According to further embodiments which can be considered alone or in combination:
the display exposure monitoring system further comprising an output unit arranged to output a signal, for example a visual and/or audio signal, to the person based on the information indicative of a visual recommendation for the person; and/or
the display exposure monitoring system further comprises a programmable lens device comprising a programmable lens and an optical function controller, the programmable lens having an optical function and extending between at least one eye of the wearer and the real world scene when the device is used by the wearer, and the optical function controller being arranged to control the optical function of the programmable lens, wherein the optical function controller is arranged to receive display exposure information from the display exposure module and modify the optical function of the programmable electronic lens device based on the received display exposure information.

The invention further relates to a method for determining display exposure information related to the exposure of a person to at least a display, the method comprising:
display exposure data receiving step, during which display exposure data indicative of the exposure of the person to a display are received,
display exposure information determining step, during which a display exposure information indicative of an alert information and/or a visual behavior recommendation and/or an activation parameter is determined based on the display exposure data.

According to further embodiments which can be considered alone or in combination:

the display exposure data comprise time exposure data indicative of the time of exposure of the person to at least one display; and/or the display exposure data comprise electromagnetic wave data indicative of a feature of the electromagnetic waves received by the person when using the at least one display;

the method further comprises a visual fatigue data receiving step during which visual fatigue data indicative of the visual fatigue of the person are received and during the display exposure information determining step the display exposure information is determined considering the visual fatigue data.

The invention further relates to a computer program product comprising one or more stored sequences of instructions that are accessible to a processor and which, when executed by the processor, causes the processor to carry out the steps of the method according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
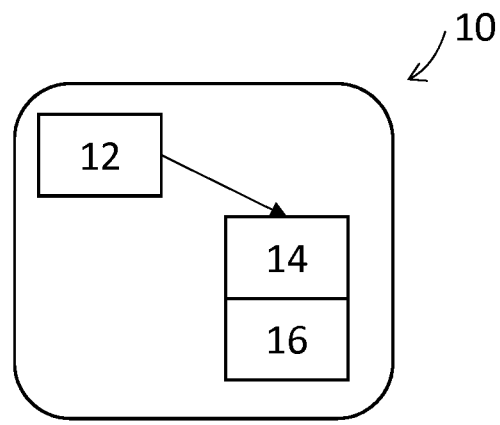
FIG. 1 is a schematic representation of a display exposure monitoring module according to the invention.

The invention relates to a display exposure monitoring module configured to monitor the exposure of a person to at least a display, for example an electronic display. As illustrated on FIG. 1, the display exposure monitoring module 10 comprises a communication component 12, a memory 14, and a processor 16.

The communication component 12 is configured to receive display exposure data, for example from a display exposure determining device as described in greater detail latter. The display exposure data are indicative of the exposure of the person to a display, for example indicative of the exposure to an electronic display of the user of a display exposure determining device according to the invention.

The display exposure data may comprise data indicative of the exposure to different display. For example, the display exposure data may differentiate the type of display based on the viewing distance. For example, the viewing distance of a person when watching a TV screen, a computer screen or a smartphone is usually different and the impact on the visual fatigue of the person is also different.

Furthermore, the quality of the display device and/or the type of back light used in display device may be considered when establishing groups of display device. Indeed, such features of the display device may have in impact on the user of the device, for example on the visual fatigue of the user.

The display exposure data may comprise time exposure data indicative of the time of exposure of the person to at least one display. The time exposure data may comprise indication of the time spent exposed to a specific display device or of the daily time of exposure to display devices in general or of the daily time of exposure to different categories of display devices.

According to an embodiment of the invention, the display exposure data comprise electromagnetic wave data. The electromagnetic wave data are indicative of a feature of the electromagnetic waves received by the person when exposed to a display device.

In a preferred embodiment of the invention, the electromagnetic wave data are indicative of features of the electromagnetic waves received by a person may correspond to:

ultraviolet, i.e. wavelength comprised between 100 nm and 400 nm; and/or visible light, i.e. wavelength comprised between 400 nm and 800 mm; and/or infrared red radiation, i.e. wavelength greater than 800 nm, and for example smaller than 2500 nm.

In a preferred embodiment, the electromagnetic wave data are indicative of the electromagnetic waves received by the eyes of the person when exposed to a display device.

Typically, the electromagnetic wave data comprise electromagnetic wave display data indicative of the frequency and/or intensity of the electromagnetic wave emitted by the display used by the person.

The memory 14 is configured to store at least computer executable instructions. The memory 14 may also be configured to store at least part of the received display exposure data.

The memory 14 may also store further user related data that may be used for determining the monitor the exposure of a user, for example, the type of smartphone or computer screen or TV screen used most used by the user. Such features may provide information concerning the display device such as the spectrum of light emission of the backlighting of the device and/or the specific absorption rate of the device.

The processor 16 is configured to execute the computer executable instructions stored in the memory 14. The computer executable instructions comprise instructions for processing the display exposure data to generate display exposure information indicative of an alert information and/or a visual behavior recommendation and/or an activation parameter.

According to an embodiment of the invention, statistics analysis of the display exposure data may be used to generate display exposure information.

Statistics involves the collection, organization, analysis, interpretation, and/or presentation of measured/collected data. With advances in technology, more extensive and complex computing allows massive amounts of data to be collected, stored and/or processed. Further, methods for evaluating the data are numerous.

The two main types of statistics are descriptive and inferential statistics.

Descriptive statistics includes methods for organizing and summarizing collected data. These methods include, but are not limited to, graphs, tables, charts and measurements such as averages, percentiles, and measures of variation of the data.

Data mining for pattern detection, machine learning and artificial intelligence methods, regression modeling and summary statistics can be employed in descriptive statistics.

Inferential statistics is based on methods for making conclusions about data collected based on the evaluation of a sample of the data. For example, predictions can be made regarding the entire set of data. An example prediction can relate to the likelihood that a level of visual fatigue is reached based on the display exposure data. Recommendations can be made according to such predictions.

Statistical methods such as regression analysis can be employed to analyze data. Regression analysis includes techniques for analyzing different variables to determine the relationship between one or more dependent variables and independent variables. For example, the analysis can be employed to determine how the value of a dependent variable changes when a value of one independent variable changes while keeping the values of other independent variables constant. Regression analysis can be employed for prediction and overlaps with the field of machine learning (a branch of artificial intelligence that employs algorithms to identify patterns in data and/or make predictions based on evaluated data).

Different models can be employed in regression analysis to model the relationship between two variables. Linear regression is a type of regression analysis. Linear regression models the relationship between a dependent variable and an independent variable using linear predictor functions. Unknown model parameters are estimated from the data on which linear regression is performed. Interpolation methods can be employed to perform prediction based on values within the set of collected data used for model-fitting while extrapolation can be employed to perform prediction based on values outside the set of collected data.

In linear regression models, the conditional mean of an independent variable given the dependent variable value is typically an affine function. In some cases, the median, or some other quantile of the conditional distribution of the independent variable given the dependent variable is a linear function of the dependent variable.

Non-linear regression is a type of regression analysis in which observed information is modeled by a non-linear function. The non-linear function is a combination of the model parameters and depends on an independent variable According to a further embodiment of the invention, the communication component is further configured to receive visual fatigue data indicative of the visual fatigue of the person.

The instructions for processing the display exposure data are arranged to generate display exposure information considering the received visual fatigue data.

For example, the visual fatigue data may provide an indication that the person's visual fatigue is over a threshold value and when generating the display exposure information such indication may be considered to generate a recommendation to the person, for example to stop using an electronic display for a given amount of time.

The communication component may further be configured to communicate at least part of the display exposure information to the at least one display device. For example, the display exposure information may comprise activation parameters that are communication to the display device to adjust the parameters of such device.

The adjustment may be limited to adjusting the display, for example the backlight. Furthermore the adjustment may be to have the display device display a message to the user, for example that he has been exposed or using the device for too long.

Figure 2:
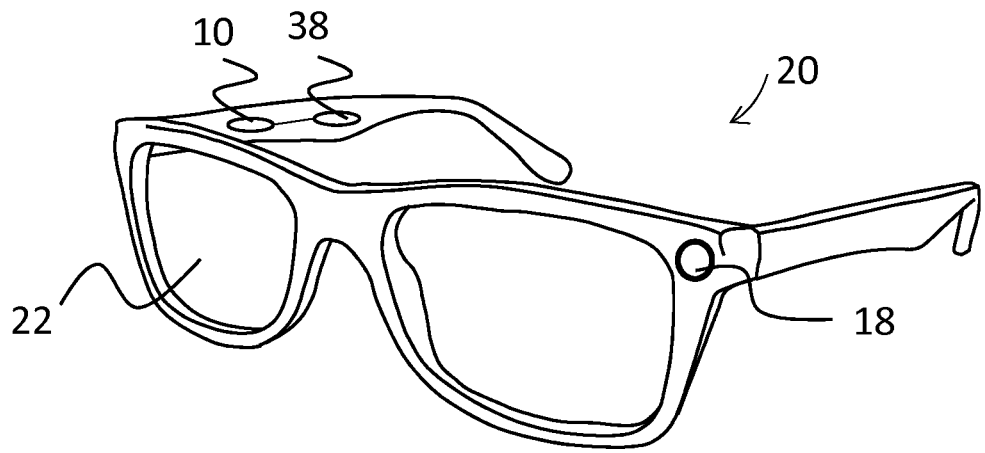
FIG. 2 is a schematic representation of a display exposure determining device according to the invention.

As illustrated on FIG. 2, the invention further relates to a display exposure determining device 20.

According to the embodiment illustrated on FIG. 2, the display exposure determining device 20 is intended to be worn by a user. Typically, the display exposure determining device 20 is a head mounted device comprising a spectacle frame that may comprise optical lenses 22.

Other head mounted device may be used, in particular head mounted devices that do not comprise optical lenses.

Furthermore, the display exposure determining device could be integrated in a smartphone or tablet using the sensors of such devices.

The display exposure determining device 20 illustrated on FIG. 2, further comprises sensors 32 and a communication unit 38.

The sensors 32 are configured to sense at least one display exposure parameter indicative of the exposure of a person to at least a display when using the display exposure determining device.

An example of sensor that may be used to detect a display is an image sensor, like a camera. Actual cameras are CMOS or CCD sensors, with medium or high definition, such as 640×480 pixels (VGA format) or HDTV 1920×1080 pixels.

The camera may be mounted on a head mounted device such as a spectacle frame and oriented so as to acquire image of the field of view of the user.

A calibration of the camera field of view can be made to better determine the zone that can be analyzed, for example the reading field of view of the user.

The communication unit 38 is configured to communicate display exposure data indicative of the exposure of the person to a display exposure monitoring module 10 according to the invention.

In the embodiment illustrated on FIG. 2, the display exposure monitoring module 10 is embedded in the display exposure determining device 20. The communication unit 38 typically communicates with the communication component 12 of the display exposure monitoring module 10 via an electrical connection.

Alternatively, the display exposure monitoring module 10 could be part of a distinct entity, for example a smartphone, a tablet, a smartwatch or any other device. Such distant entity may typically communicate with the display exposure determining device or module by wireless communication. The wireless communication can use different communication protocols such a Bluetooth, Zigbee, Wifi or others.

Figure 3:
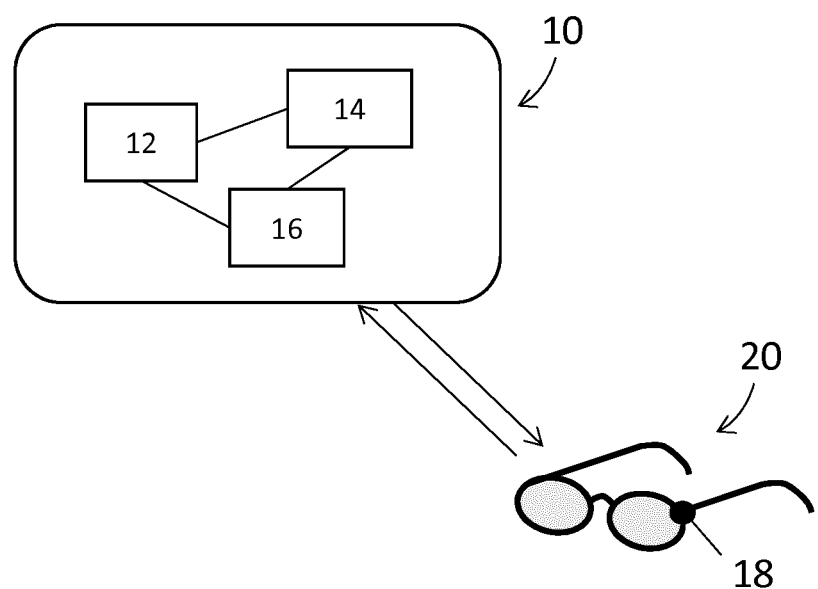
FIG. 3 is a schematic representation of a display exposure monitoring system according to the invention.

As illustrated on FIG. 3, the invention further relates to a display exposure monitoring system comprising a display exposure monitoring module 10 according to the invention and a display exposure determining device 20 according to the invention. The display exposure determining device 20 is configured to send display exposure data to the display exposure monitoring module.

Although not represented on the figures, the display exposure monitoring system according to the invention may comprise an output unit arranged to output a signal, for example a visual and/or audio signal, to the person based on the information indicative of a visual recommendation for the person.

Typically, the output unit may be a visual output unit configured to provide a visual signal to the user based on the information indicative of the display exposure information. Such visual signal output unit may be a simple led or a more complex display device allowing for example to display a text message to the user.

The output unit may be an audio output unit such as a speaker or an intraocular prosthesis outputting an audio message to the user.

The output unit may be configured to provide a haptic feedback to the user such as a specific vibration.

The output unit may be part of a distant entity connected to the display exposure monitoring system. For example the output unit may be part a personal digital assistants, an audio/video device, a mobile phone, a MPEG-1 Audio Layer 3 (MP3) player, a personal computer, a laptop, a tablet, a bluetooth headset, a watch, a wristband, etc. . . .

Such distant entity may typically communicate with the elements of the display exposure monitoring system by wireless communication. The wireless communication can use different communication protocols such a Bluetooth, Zigbee, Wifi or others.

The display exposure monitoring system may comprise a programmable lens device comprising a programmable lens and an optical function controller.

Typically, the programmable lens has an optical function and extending between at least one eye of the wearer and the real world scene when the device is used by the wearer. The optical function controller is arranged to control the optical function of the programmable lens.

According to the invention, the optical function controller is arranged to receive display exposure information from the display exposure module and modify the optical function of the programmable electronic lens device based on the received display exposure information.

The optical function may comprise dioptric function, light absorption, polarizing capability, reinforcement of contrast capacity, etc. . . .

The dioptric function corresponds to the optical lens power (mean power, astigmatism etc. . . . ) as a function of the gaze direction.

The optical function of the programmable lens may comprise the dioptric function of at least one of the lenses, a sun protection function for example by controlling a transmission parameter of the lens or the polarization of a surface of the lens.

For example, the dioptric function may be adapted based on the display exposure data by adapting the addition in the near zone to relieve the user from visual fatigue. The color or light absorption of the optical lenses may also be adapted based on the display exposure data.

Advantageously, that optical function won't comprise the addition/tint when it is not needed by the user and thus protecting eyes of the user from unnecessary symptoms of headache, dizziness etc.

The invention further relates to a method for determining display exposure information related to the exposure of a person to at least one display, for example an electronic display.

Figure 4:
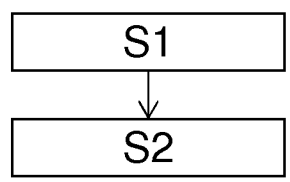
FIG. 4 is an illustration of a chart-flow of a method according to the invention.

As illustrated on FIG. 4, the method comprises:
display exposure data receiving step S1, and
display exposure information determining step S2.

During the display exposure data receiving step S1 display exposure data indicative of the exposure of the person to a display are received. Typically, the display exposure data are sense by a sensor of a display exposure determining device according to the invention.

To determine that the person is watching a display screen the method of the invention may comprises analyzing images of the scene facing the user.

Typically, the image is analyzed and a rectangular object detection is made, to detect a display shape. This rectangular object can be seen as a rectangle with some shape distortion because it is not oriented perfectly in front of the camera axis, so it is seen as a trapeze.

Inside this surface the luminance is higher than outside if the surface is an emissive screen, like LCD or OLED display, and the image is usually not static.

Dynamic image analysis can also give relevant information about the user activity, for example watching a movie or playing video game. Rectangle detection and high luminance checking can detect an emissive screen.

The method may comprise detecting round shapes that are typical with curved TV set.

Analyzing the shape of the rectangle can give information of the type of screen, like smartphone, TV, tablet or game console screen.

Also with a camera having small integration time when a LCD display screen is filmed the resulting image may not be uniform, because of scanning difference frequencies between the screen and the camera. This artefact can be used to detect that the camera is acquiring images of an electronic display.

Difference with outside window view can be made easily because a window is usually much bigger size, and luminance in the window surface is much higher that luminance of a TV screen, during the day. During the night the window is a fixed image and can be also easily discriminated.

If the person is reading an e-book, with non-emissive display, the rectangle shape can be also detected and inside the rectangle the image has a special luminance distribution that can be detected by histogram. Indeed, typically e-book display only use two colors. Paper book can be differentiated because the luminance distribution is not be the same, due to paper reflectance with external light, and also the shape of a book is no exactly rectangular, because of folded pages or cover.

With additional sensors it is possible to improve the detection quality. For example a dual camera system can provide 3D measurement of the environment and improve the screen detection, the screen can be held on the hand in case of small display, or in a room in case of TV screen or computer screen. External window is also easily detected because on the same surface as a wall.

It is also possible to detect signal coming from the screen in case it emit some signal, for example 3D TV that emit sync signal for electronic shutter glasses, or TV with a bluetooth sound channel. In these cases the display exposure device can detect the signal emitted from the display device, and detect more easily that the person is exposed to the display device, for example is watching the display device.

Another sensor that can help to detect electronic display is based on wavelength detection of the display. LCD display use Red Green and Blue filters and white LED to make the display, and the resulting is emission of particular wavelength very different from natural light, that have a regular and fixed spectrum.

OLED displays also have three basic color wavelengths, that depend of the LED structure. A spectrum analysis can easily detect if the light received is natural, for example coming from a window or reflectance of a book in natural light, or from an electronic display device, such as a TV or computer or phone screen.

A Time of Flight distance sensor can also improve the detection, because reflectance on a screen is very different compared to paper or other object. An electronic display emits light and does not reflect well the infrared light emitted by the TOF sensor, whereas a passive object like a paper book better reflects the TOF beam, and does not emit light.

Accelerometer and gyroscope mounted in a head mounted device may also be sensors that can be used to improve detection, because these sensors give information about the person's behavior. For example the head of a person usually do not move when watching a screen or book. Therefore, if the accelerometer and gyroscope sensors detect an important head activity, this means that the person is not watching a screen and the search of screen can be disabled, to save energy. Furthermore, usually when reading a book or a small screen the head is oriented down, and horizontally when watching TV or a computer screen.

During the display exposure information determining step S2, a display exposure information indicative of an alert information and/or a visual behavior recommendation and/or an activation parameter is determined based on the display exposure data.

As detailed previously, the display exposure information may be determined using statistical analyzes of the display exposure data.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A display exposure monitoring module configured to monitor exposure of a person to a plurality of displays of different devices, the module comprising:
   a communication component configured to receive display exposure data indicative of the exposure of the person to the plurality of displays, the display exposure data comprising time exposure data indicative of a time of exposure of the person to the plurality of displays, the time exposure data comprising a daily time of exposure of the person to different categories of display devices,
   a memory storing computer executable instructions and configured to store the received display exposure data; and
   a processor for executing the computer executable instructions, wherein the computer executable instructions comprises instructions for processing the display exposure data to generate display exposure information indicative of an alert information and/or a visual behavior recommendation and/or an activation parameter.

2. The display exposure monitoring module according to claim 1, wherein the display exposure data comprise electromagnetic wave data indicative of a feature of electromagnetic waves received by eyes of the person when using the plurality of displays.

3. The display exposure monitoring module according to claim 1, wherein the communication component is further configured to receive visual fatigue data indicative of visual fatigue of the person and the instructions for processing the display exposure are arranged to generate display exposure information considering the received visual fatigue data.

4. The display exposure monitoring module according to claim 1, wherein the communication component is further configured to communicate at least part of the display exposure information to the plurality of displays.

5. A display exposure determining device comprising at least one display exposure sensor configured to sense at least one display exposure parameter indicative of the exposure of the person to a plurality of displays when using the display exposure determining device and a communication unit configured to communicate display exposure data indicative of the exposure of the person to the display exposure monitoring module according to claim 1.

6. The display exposure determining device according to claim 5, wherein the display exposure sensor comprises a scene image acquisition sensor, a camera, configured to acquire a scene image of an environment facing the person and an image processing module configured to process the acquired images to identify an active display in the environment facing the person.

7. The display exposure determining device according to claim 5, wherein the display exposure monitoring module is embedded in the device.

8. The display exposure determining device according to claim 5, wherein the display exposure determining device is one of the devices comprised in the list consisting of a head mounted device, a smartphone and a tablet.

9. A display exposure monitoring system comprising a display exposure monitoring module according to claim 1, and a display exposure determining device, wherein the display exposure determining device is configured to send display exposure data to the display exposure monitoring module.

10. The display exposure monitoring system according to claim 9, further comprising an output unit arranged to output a signal, a visual and/or audio signal, to the person based on the information indicative of a visual recommendation for the person.

11. The display exposure monitoring system according to claim 9, further comprising a programmable lens device comprising a programmable lens and an optical function controller, programmable lens having an optical function and extending between at least one eye of a wearer and a real world scene when the device is used by the wearer, and the optical function controller being arranged to control the optical function of the programmable lens, wherein the optical function controller is arranged to receive display exposure information from the display exposure monitoring module and modify the optical function of the programmable lens device based on the received display exposure information.

12. A method for determining display exposure information related to exposure of a person to a plurality of displays of different devices, the method comprising:
   display exposure data receiving step, during which display exposure data indicative of the exposure of the person to the plurality of displays are received, the display exposure data comprise time exposure data indicative of a time of exposure of the person to the plurality of displays, the time exposure data comprising a daily time of exposure of the person to different categories of display devices, and
   display exposure information determining step, during which a display exposure information indicative of an alert information and/or a visual behavior recommendation and/or an activation parameter is determined based on the display exposure data.

13. The method according to claim 12, wherein the display exposure data are determined based on an analysis of images of a scene facing a user.

14. The method according to claim 12, wherein the display exposure data comprise electromagnetic wave data indicative of a feature of electromagnetic waves received by the person when using the plurality of displays.

\* \* \* \* \*